J. G. De Coursey,
Trundling Hoop,
№ 70,974. Patented Nov. 19, 1867.

Witnesses:
Rowbotham
S. K. H. Godam.

Inventor:
J. G. DeCoursey
By his attorney
H. H. Cowan

United States Patent Office.

JOHN G. DE COURSEY, OF PHILADELPHIA, PENNSYLVANIA.

Letters Patent No. 70,974, dated November 19, 1867.

IMPROVEMENT IN TRUNDLING-HOOPS.

*The Schedule referred to in these Letters Patent and making part of the same.*

TO ALL WHOM IT MAY CONCERN:

Be it known that I, JOHN G. DE COURSEY, of Philadelphia, Pennsylvania, have invented an Improvement in Trundling-Hoops; and I do hereby declare the following to be a full, clear, and exact description of the same.

My invention consists of a trundling-hoop, to which an arm or handle is connected, as fully described hereafter, so that the person who propels the hoop may also guide it and support it vertically by means of the said arm.

In order to enable others to make my invention, I will now proceed to describe the manner of constructing the same, reference being had to the accompanying drawing, which forms a part of this specification, and in which—

Figure 1:
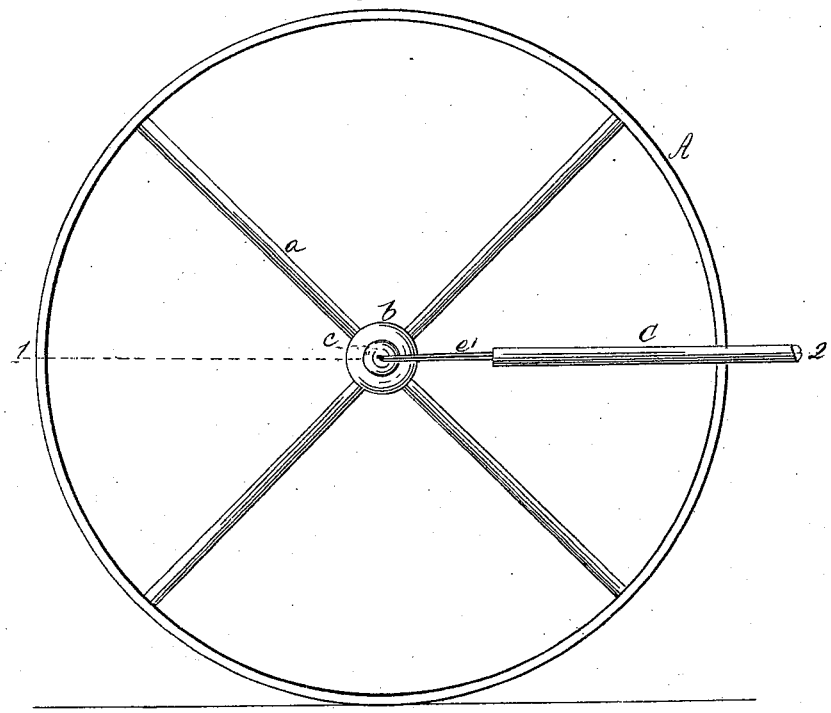

Figure 1 is a side view of my improved trundling-hoop, and

Figure 2:
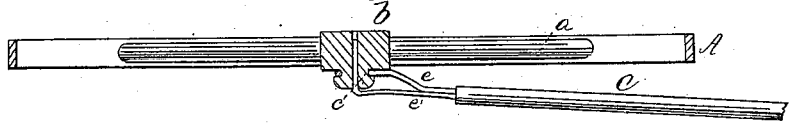

Figure 2 a section on the line 1-2, fig. 1.

A is a hoop, to which are connected the outer ends of spokes $a$, the inner ends of the latter being secured to a hub, $b$. An arm or handle, C, is connected to the hub $b$ by rods $e\ e'$, each secured at one end to the handle, the rod $e$ being bent round the neck of a flanged projection, $c$, at one side of the hub, and the bent end of the rod $e'$ extending into an opening in the centre of the hub, so that the hoop can revolve freely on, while being pushed forward and guided by, the handle, the latter being permanently connected to the hoop.

The hoop, which rolls upon the ground, is supported vertically, and is guided by means of the handle C, which is retained in the hand of the child by whom the hoop is propelled. The operator has, therefore, a perfect control over the movement of the hoop, so that accidents resulting to children from their being led to dangerous positions to recover hoops which have passed from their control are prevented.

Without confining myself to the within-described mode of securing the handle to the hoop, I claim as my invention, and desire to secure by Letters Patent—

The hoop A, with its hub $b$ and spokes $a$, in combination with an arm or handle C, connected to the said hub, substantially as and for the purpose described.

In testimony whereof I have signed my name to this specification in the presence of two subscribing witnesses.

JOHN G. DE COURSEY.

Witnesses:
CHARLES E. FOSTER,
W. J. R. DELANY.